US012641123B2

(12) United States Patent
Crabtree et al.

(10) Patent No.: US 12,641,123 B2
(45) Date of Patent: May 26, 2026

(54) ADVANCED DETECTION OF IDENTITY-BASED ATTACKS TO ASSURE IDENTITY FIDELITY IN INFORMATION TECHNOLOGY ENVIRONMENTS

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 748 days.

(21) Appl. No.: 17/960,081

(22) Filed: Oct. 4, 2022

(65) Prior Publication Data

US 2023/0113332 A1      Apr. 13, 2023

Related U.S. Application Data

(63) Continuation-in-part of application No. 17/567,060, filed on Dec. 31, 2021, which is a continuation-in-part of application No. 17/389,863, filed on Jul. 30, 2021, now Pat. No. 11,792,229, which is a continuation of application No. 16/792,754, filed on Feb. 17, 2020, now Pat. No. 11,184,401, which is a continuation-in-part of application No. 16/779,801, filed on Feb. 3, 2020, now Pat. No. 11,032,323, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of (Continued)

(51) Int. Cl.
H04L 9/40 (2022.01)
G06F 16/2458 (2019.01)
G06F 16/951 (2019.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1425; H04L 63/1441; G06F 16/2477; G06F 16/951
See application file for complete search history.

(56) References Cited

U.S. PATENT DOCUMENTS 5,669,000 A      9/1997  Jessen et al.
6,256,544 B1     7/2001  Weissinger
(Continued)

*Primary Examiner* — Oleg Korsak
(74) *Attorney, Agent, or Firm* — NK Patent Law

(57) ABSTRACT

A system and method for the detection and mitigation of Kerberos golden ticket, silver ticket, and related identity-based cyberattacks by passively monitoring and analyzing Kerberos and authentication operations within the network. The system and method provide real-time detections of identity attacks using time-series data and data pipelines, and by transforming the stateless Kerberos protocol into stateful protocol. A packet capturing agent is deployed on the network where captured time-series Kerberos and related event and log information is processed in distributed computational graph (DCG) stages where declarative rules determine if an attack is being carried out and what type of attack it is.

18 Claims, 12 Drawing Sheets

Related U.S. Application Data application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 17/567,060 is a continuation-in-part of application No. 17/170,288, filed on Feb. 8, 2021, now Pat. No. 11,570,204, which is a continuation-in-part of application No. 17/169, 924, filed on Feb. 8, 2021, now Pat. No. 11,570,209, which is a continuation-in-part of application No. 15/837,845, filed on Dec. 11, 2017, now Pat. No. 11,005,824, which is a continuation-in-part of application No. 15/825,350, filed on Nov. 29, 2017, now Pat. No. 10,594,714, which is a continuation-in-part of application No. 15/725,274, filed on Oct. 4, 2017, now Pat. No. 10,609,079, said application No. 17/567,060 is a continuation-in-part of application No. 17/102,561, filed on Nov. 24, 2020, now abandoned, which is a continuation of application No. 15/790,457, filed on Oct. 23, 2017, now Pat. No. 10,884,999, which is a continuation-in-part of application No. 15/790,327, filed on Oct. 23, 2017, now Pat. No. 10,860,951, and a continuation-in-part of application No. 15/616,427, filed on Jun. 7, 2017, now abandoned, and a continuation-in-part of application No. 15/141,752, filed on Apr. 28, 2016, now Pat. No. 10,860,962, application No. 17/960,081, filed on Oct. 4, 2022 is a continuation-in-part of application No. 17/000,504, filed on Aug. 24, 2020, now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, which is a continuation-in-part of application No. 15/887,496, filed on Feb. 2, 2018, now Pat. No. 10,783,241, which is a continuation-in-part of application No. 15/823, 285, filed on Nov. 27, 2017, now Pat. No. 10,740,096, which is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, which is a continuation-in-part of application No. 15/616,427, filed on Jun. 7, 2017, now abandoned, said application No. 15/887,496 is a continuation-in-part of application No. 15/818,733, filed on Nov. 20, 2017, now Pat. No. 10,673,887, which is a continuation-in-part of application No. 15/725,274, filed on Oct. 4, 2017, now Pat. No. 10,609,079, said application No. 16/855,724 is a continuation-in-part of application No. 16/777,270, filed on Jan. 30, 2020, now Pat. No. 11,025,674, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, which is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, which is a continuation-in-part of application No. 15/790,457, filed on Oct. 23, 2017, now Pat. No. 10,884,999, said application No. 15/849,901 is a continuation-in-part of application No. 15/835,312, filed on Dec. 7, 2017, now Pat. No. 11,055,451, which is a continuation-in-part of application No. 15/186,453, filed on Jun. 18, 2016, now abandoned, said application No. 16/248, 133 is a continuation-in-part of application No. 15/813,097, filed on Nov. 14, 2017, now abandoned, which is a continuation-in-part of application No. 15/616,427, filed on Jun. 7, 2017, now abandoned, said application No. 16/248,133 is a continuation-in-part of application No. 15/806,697, filed on Nov. 8, 2017, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, said application No. 15/806,697 is a continuation-in-part of application No. 15/343,209, filed on Nov. 4, 2016, now Pat. No. 11,087,403, which is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, which is a continuation-in-part of application No. 15/206,195, filed on Jul. 8, 2016, now abandoned, said application No. 16/248, 133 is a continuation-in-part of application No. 15/673,368, filed on Aug. 9, 2017, now abandoned, which is a continuation-in-part of application No. 15/376,657, filed on Dec. 13, 2016, now Pat. No. 10,402,906.

(60) Provisional application No. 62/596,105, filed on Dec. 7, 2017, provisional application No. 62/568,291, filed on Oct. 4, 2017, provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,307, filed on Oct. 4, 2017.

(56) References Cited

U.S. PATENT DOCUMENTS

| | | | |
|---|---|---|---|
| 7,072,863 | B1 | 7/2006 | Phillips et al. |
| 7,657,406 | B2 | 2/2010 | Tolone et al. |
| 7,698,213 | B2 | 4/2010 | Lancaster |
| 7,739,653 | B2 | 6/2010 | Venolia |
| 8,065,257 | B2 | 11/2011 | Kuecuekyan |
| 8,145,761 | B2 | 3/2012 | Liu et al. |
| 8,281,121 | B2 | 10/2012 | Nath et al. |
| 8,615,800 | B2 | 12/2013 | Baddour et al. |
| 8,788,306 | B2 | 7/2014 | Delurgio et al. |
| 8,793,758 | B2 | 7/2014 | Raleigh et al. |
| 8,914,878 | B2 | 12/2014 | Burns et al. |
| 8,997,233 | B2 | 3/2015 | Green et al. |
| 9,134,966 | B2 | 9/2015 | Brock et al. |
| 9,141,360 | B1 | 9/2015 | Chen et al. |
| 9,602,530 | B2 | 3/2017 | Ellis et al. |
| 9,654,495 | B2 | 5/2017 | Hubbard et al. |
| 9,672,355 | B2 | 6/2017 | Titonis et al. |
| 9,762,443 | B2 | 9/2017 | Dickey |
| 9,807,104 | B1 | 10/2017 | Sarra |
| 9,887,933 | B2 | 2/2018 | Lawrence, III |
| 9,916,133 | B2 | 3/2018 | Jubran et al. |
| 9,946,517 | B2 | 4/2018 | Talby et al. |
| 10,015,175 | B2 | 7/2018 | Kent et al. |
| 10,061,635 | B2 | 8/2018 | Ellwein |
| 10,102,480 | B2 | 10/2018 | Dirac et al. |
| 10,205,735 | B2 | 2/2019 | Apostolopoulos |
| 10,210,246 | B2 | 2/2019 | Stojanovic et al. |
| 10,210,255 | B2 | 2/2019 | Crabtree et al. |
| 10,248,910 | B2 | 4/2019 | Crabtree et al. |
| 10,318,882 | B2 | 6/2019 | Brueckner et al. |
| 10,367,829 | B2 | 7/2019 | Huang et al. |
| 10,387,631 | B2 | 8/2019 | Duggal et al. |
| 10,515,366 | B1 | 12/2019 | Gorelik et al. |
| 10,742,667 | B1 | 8/2020 | Stern et al. |
| 2005/0289072 | A1 | 12/2005 | Sabharwal |
| 2010/0082493 | A1 | 4/2010 | Agrawal et al. |
| 2010/0115276 | A1 | 5/2010 | Betouin et al. |
| 2013/0304623 | A1 | 11/2013 | Kumar et al. |
| 2014/0279762 | A1 | 9/2014 | Xaypanya et al. |
| 2014/0380427 | A1 | 12/2014 | Srinivasan et al. |
| 2015/0249669 | A1 | 9/2015 | Gamage et al. |
| 2016/0004858 | A1 | 1/2016 | Chen et al. |
| 2016/0065565 | A1 | 3/2016 | Plotnik et al. |
| 2016/0099960 | A1 | 4/2016 | Gerritz et al. |
| 2016/0140519 | A1 | 5/2016 | Trepca et al. |
| 2016/0275123 | A1 | 9/2016 | Lin et al. |
| 2016/0330233 | A1 | 11/2016 | Hart |
| 2016/0364307 | A1 | 12/2016 | Garg et al. |
| 2017/0124464 | A1 | 5/2017 | Crabtree et al. |
| 2017/0244730 | A1 | 8/2017 | Sancheti et al. |
| 2017/0364450 | A1* | 12/2017 | Struttmann ........... H04L 9/3297 |
| 2020/0014659 | A1 | 1/2020 | Chasman et al. |
| 2023/0113332 | A1* | 4/2023 | Crabtree ............... G06F 21/554 726/22 |

* cited by examiner

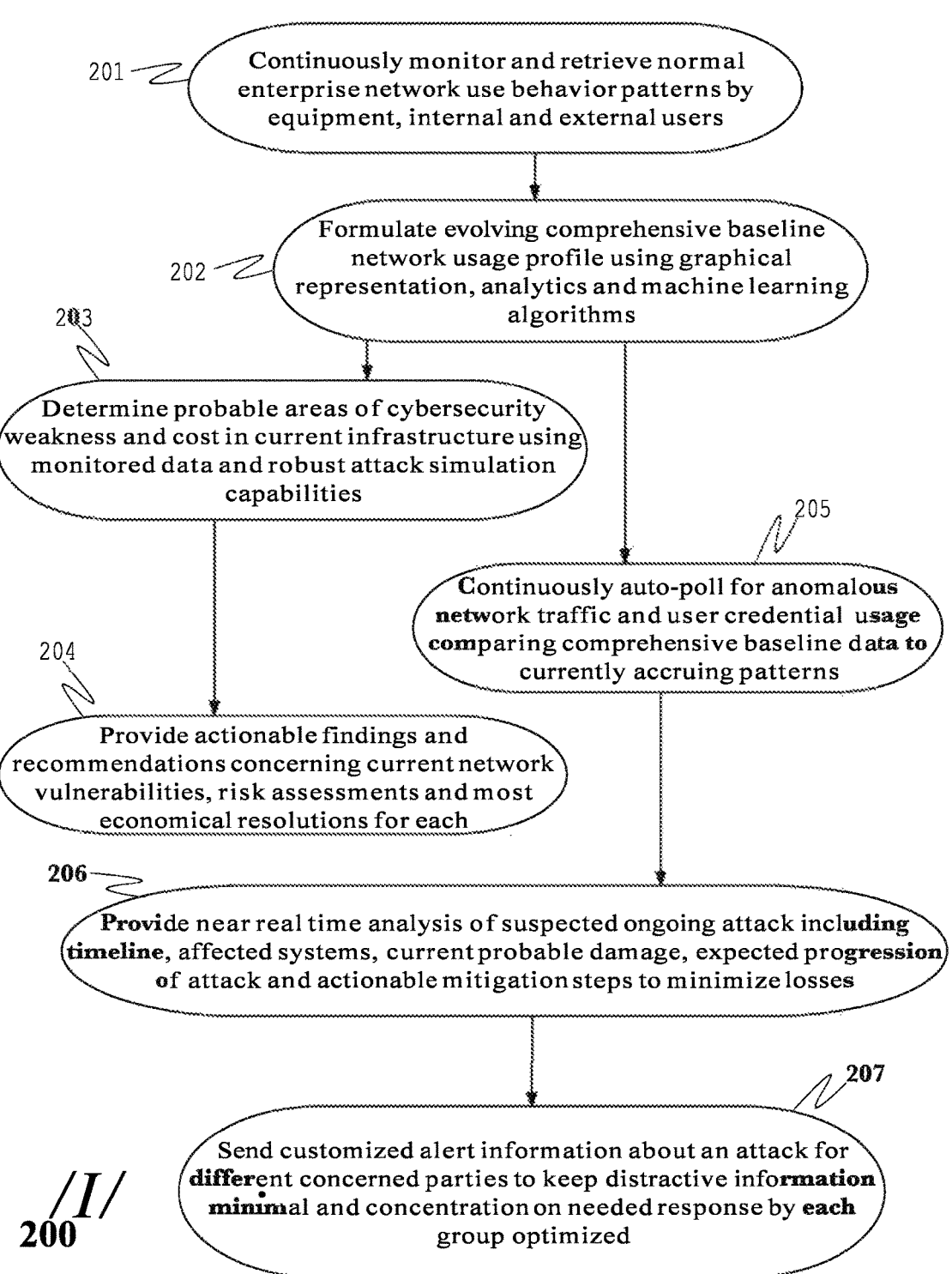

201 — Continuously monitor and retrieve normal enterprise network use behavior patterns by equipment, internal and external users 202 — Formulate evolving comprehensive baseline network usage profile using graphical representation, analytics and machine learning algorithms 203 — Determine probable areas of cybersecurity weakness and cost in current infrastructure using monitored data and robust attack simulation capabilities 205 — Continuously auto-poll for anomalous network traffic and user credential usage comparing comprehensive baseline data to currently accruing patterns 204 — Provide actionable findings and recommendations concerning current network vulnerabilities, risk assessments and most economical resolutions for each 206 — Provide near real time analysis of suspected ongoing attack including timeline, affected systems, current probable damage, expected progression of attack and actionable mitigation steps to minimize losses 207 — Send customized alert information about an attack for different concerned parties to keep distractive information minimal and concentration on needed response by each group optimized

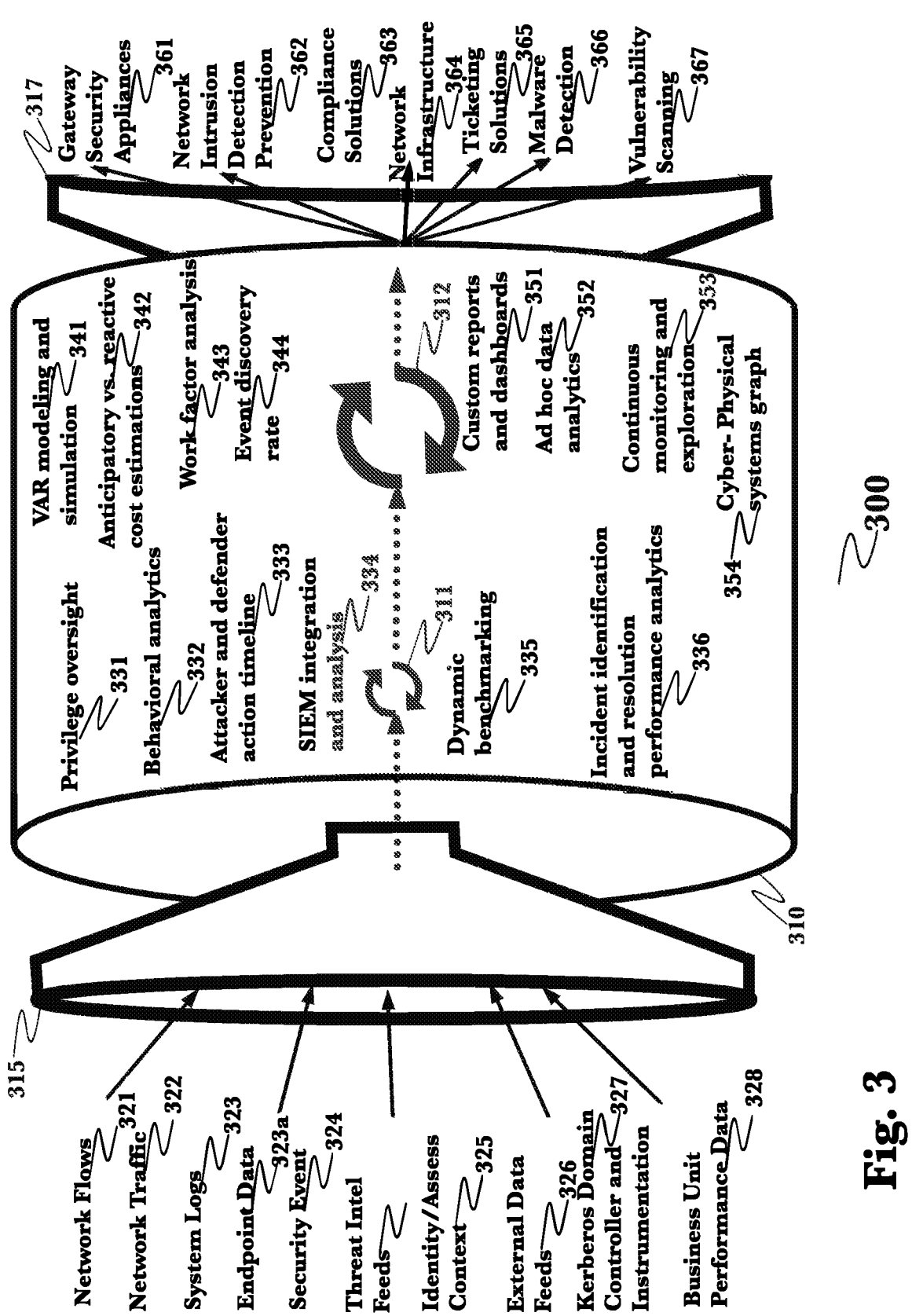

Network Flows 321
Network Traffic 322
System Logs 323
Endpoint Data 323a
Security Event 324
Threat Intel Feeds
Identity/Assess Context 325
External Data Feeds 326
Kerberos Domain Controller and 327
Instrumentation
Business Unit Performance Data 328

310

Privilege oversight 331
Behavioral analytics 332
Attacker and defender action timeline 333
SIEM integration and analysis 334
Dynamic benchmarking 335
Incident identification and resolution performance analytics 336

VAR modeling and simulation 341
Anticipatory vs. reactive cost estimations 342
Work-factor analysis 343
Event discovery rate 344

311

Custom reports and dashboards 351
Ad hoc data analytics 352
Continuous monitoring and exploration 353
354 Cyber-Physical systems graph

312

317
Gateway Security Appliances 361
Network Intrusion Detection Prevention 362
Compliance Solutions 363
Network Infrastructure
Ticketing Solutions 364
Malware Detection 365 366
Vulnerability Scanning 367

300

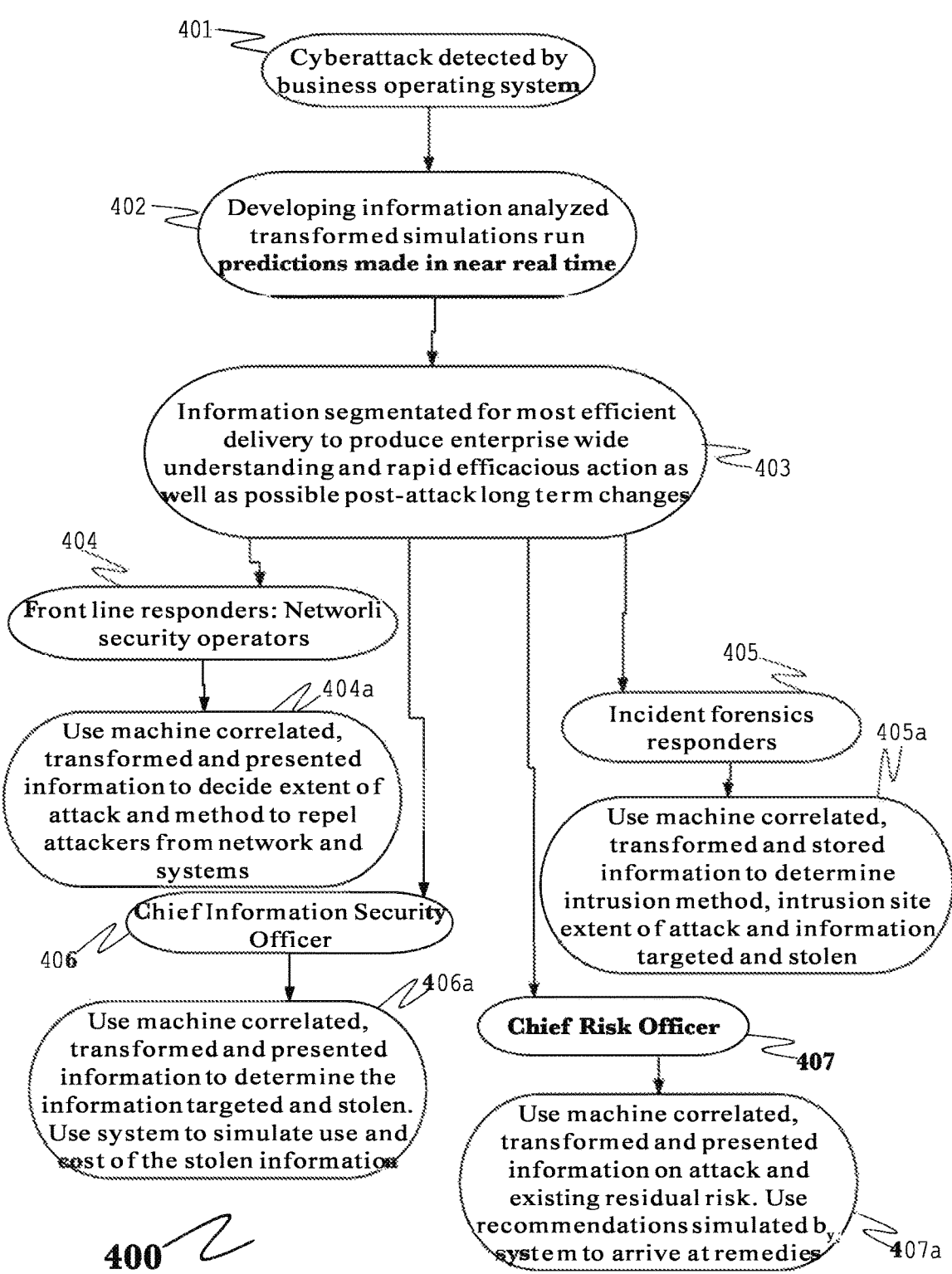

401

Cyberattack detected by business operating system

402

Developing information analyzed transformed simulations run predictions made in near real time

Information segmentated for most efficient delivery to produce enterprise wide understanding and rapid efficacious action as well as possible post-attack long term changes
403

404

Front line responders: Networli security operators

404a

Use machine correlated, transformed and presented information to decide extent of attack and method to repel attackers from network and systems

405

Incident forensics responders

405a

Use machine correlated, transformed and stored information to determine intrusion method, intrusion site extent of attack and information targeted and stolen Chief Information Security Officer

406

406a

Use machine correlated, transformed and presented information to determine the information targeted and stolen. Use system to simulate use and cost of the stolen information

Chief Risk Officer

407

Use machine correlated, transformed and presented information on attack and existing residual risk. Use recommendations simulated by system to arrive at remedies
407a

ADVANCED DETECTION OF
IDENTITY-BASED ATTACKS TO ASSURE
IDENTITY FIDELITY IN INFORMATION
TECHNOLOGY ENVIRONMENTS

CROSS-REFERENCE TO RELATED
APPLICATIONS

Priority is claimed in the application data sheet to the
following patents or patent applications, each of which is
expressly incorporated herein by reference in its entirety:
  Ser. No. 17/567,060
  Ser. No. 17/389,863
  Ser. No. 16/792,754
  Ser. No. 16/779,801
  Ser. No. 16/777,270
  Ser. No. 16/720,383
  Ser. No. 15/823,363
  Ser. No. 15/725,274
  Ser. No. 15/655,113
  Ser. No. 15/616,427
  Ser. No. 14/925,974
  Ser. No. 15/237,625
  Ser. No. 15/206,195
  Ser. No. 15/186,453
  Ser. No. 15/166,158
  Ser. No. 15,141,752
  Ser. No. 15/091,563
  Ser. No. 14/986,536
  Ser. No. 17/170,288
  Ser. No. 17/169,924
  Ser. No. 15/837,845
  62/596,105
  Ser. No. 15/825,350
  Ser. No. 17/102,561
  Ser. No. 15/790,457
  Ser. No. 15/790,327
  62/568,291
  62/568,298
  Ser. No. 17/000,504
  Ser. No. 16/855,724
  Ser. No. 16/836,717
  Ser. No. 15/887,496
  Ser. No. 15/823,285
  Ser. No. 15/788,718
  Ser. No. 15/788,002
  Ser. No. 15/787,601
  Ser. No. 15/835,312
  62/568,305
  62/568,307
  Ser. No. 15/818,733
  Ser. No. 16/412,340
  Ser. No. 16/267,893
  Ser. No. 16/248,133
  Ser. No. 15/849,901
  Ser. No. 15/835,436
  62/568,312
  Ser. No. 15/813,097
  Ser. No. 15/616,427
  Ser. No. 15/806,697
  Ser. No. 15/376,657
  Ser. No. 15/343,209
  Ser. No. 15/229,476
  Ser. No. 15/673,368

BACKGROUND OF THE INVENTION

Field of the Invention

This disclosure relates to the field of computer manage-
ment, and more particularly to the field of cybersecurity.

Discussion of the State of the Art

Attacks undermining the identity safeguards inside an IT
enterprise (such as golden and silver ticket Kerberos attacks)
pose some of the greatest threats to enterprise security, yet
many go undetected for months or years, and some are never
detected. Current cybersecurity solutions only go as far as
detecting limited variants of some attacks as generated by
common hacking tools and even then, they do so by estab-
lishing a heuristic baseline over a period of several weeks.
Additionally, this heuristic approach generates numerous
false positives and bypassing these approaches is well
known and well documented publicly leaving no secure
means of protection from these attacks.

The consequences of attacks against identity foundations
and the Kerberos protocol are extremely disruptive. Com-
plete recovery is usually the costly and time-consuming
process of tearing down and rebuilding an organization's
entire Active Directory infrastructure, a process which may
have to be repeated multiple times if the initial exploit is
unresolved and is simply reused by the threat actor each
iteration. This is common because hasty decisions by cyber-
security personnel to rebuild the infrastructure often elimi-
nate evidentiary information about the attacker and the
origin of the attack which might be used to prevent reuse.

What is needed is a system and method to detect Kerberos
authentication attacks in a timely and precise manner.

SUMMARY OF THE INVENTION

Accordingly, the inventor has developed a system and
method for the detection and mitigation of Kerberos golden
ticket, silver ticket, and related identity-based cyberattacks
by passively monitoring and analyzing Kerberos and authen-
tication operations within the network. The system and
method provide real-time detections of identity attacks using
time-series data and data pipelines, and by transforming the
stateless Kerberos protocol into stateful protocol. A packet
capturing agent is deployed on the network where captured
time-series Kerberos and related event and log information
is processed in distributed computational graph (DCG)
stages where declarative rules determine if an attack is being
carried out and what type of attack it is.

According to a preferred embodiment, a system for detec-
tion and mitigation of golden and silver ticket attacks is
disclosed, comprising: a cyber-physical graph module com-
prising a first plurality of programming instructions stored in
a memory of, and operating on a processor of, a computing
device, wherein the first plurality of programming instruc-
tions, when operating on the processor, cause the computing
device to: retrieve information about a plurality of steps
regarding a Kerberos transaction, the information compris-
ing authentication data regarding clients, services, and key
distribution centers; create a cyber-physical graph represent-
ing a period of Kerberos transactions, the cyber-physical
graph comprising nodes representing the clients, services,
and key distribution centers associated with a plurality of
Kerberos transactions and edges representing the hash val-
ues associated with each independent Kerberos transaction;
and identify cybersecurity attacks using graph traversal algorithms to determine where expected communications in an authentication protocol are missing.

According to another preferred embodiment, a method for detection and mitigation of golden and silver ticket attacks is disclosed, comprising the steps of: retrieving information about a plurality of steps regarding a Kerberos transaction, the information comprising authentication data regarding clients, services, and key distribution centers; creating a cyber-physical graph representing a period of Kerberos transactions, the cyber-physical graph comprising nodes representing the clients, services, and key distribution centers associated with a plurality of Kerberos transactions and edges representing the hash values associated with each independent Kerberos transaction; and identifying cybersecurity attacks using graph traversal algorithms to determine where expected communications in an authentication protocol are missing.

According to an aspect of an embodiment, the cyber-physical graph further comprises edges with time and date information.

According to an aspect of an embodiment, the graph traversal algorithm detects golden ticket attacks.

According to an aspect of an embodiment, the graph traversal algorithm detects silver ticket attacks.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 2 is a flow diagram of an exemplary function of the business operating system in the detection and mitigation of predetermining factors leading to and steps to mitigate ongoing cyberattacks.

FIG. 3 is a process diagram showing business operating system functions in use to mitigate cyberattacks.

FIG. 4 is a process flow diagram of a method for segmenting cyberattack information to appropriate corporation parties.

DETAILED DESCRIPTION OF THE INVENTION

Figure 1:
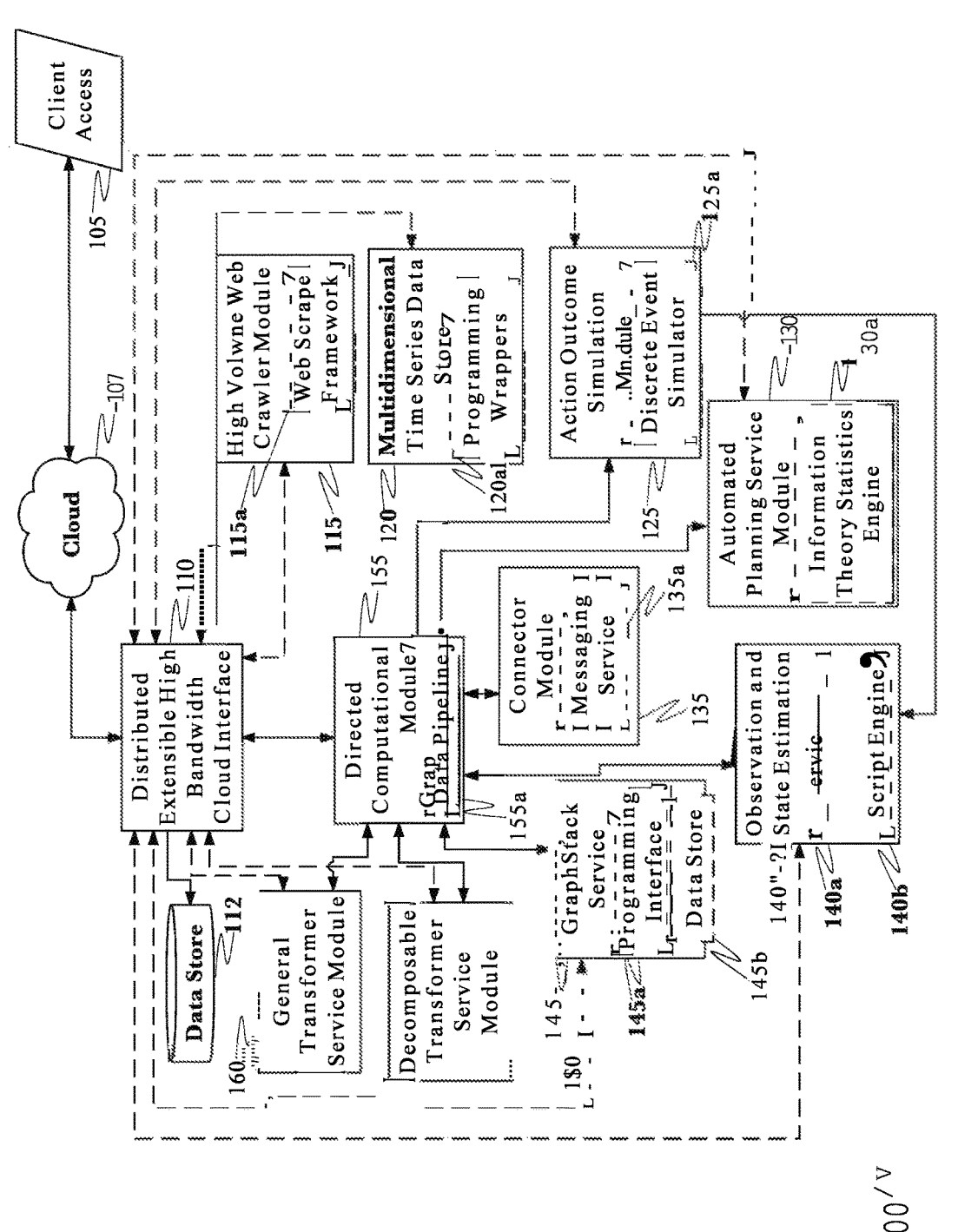
FIG. 1 is a diagram of an exemplary architecture of a business operating system according to an embodiment of the invention.

The inventor has conceived, and reduced to practice, a system and method for the detection and mitigation of Kerberos golden ticket, silver ticket, and related identity-based cyberattacks by passively monitoring and analyzing Kerberos and authentication operations within the network. The system and method provide real-time detections of identity attacks using time-series data and data pipelines, and by transforming the stateless Kerberos protocol into stateful protocol. A packet capturing agent is deployed on the network where captured time-series Kerberos and related event and log information is processed in distributed computational graph (DCG) stages where declarative rules determine if an attack is being carried out and what type of attack it is along with appropriate detection metadata (e.g. source, principal, etc) that is necessary for conducting an investigation.

Kerberos is a computer network authentication protocol employed across most enterprise networks and is the default authentication method for Microsoft Active Directory (AD). As threat actors find new ways into computer networks, Kerberos becomes a very attractive target for achieving persistent and undetected access using methods such as Golden Ticket (forged Ticket Granting Ticket or TGT) or Silver Ticket (forged Ticket Granting Service or TGS) attacks and other Kerberos related attacks.

As a stateless protocol, Kerberos transactions during the authentication process are not retained throughout or after the session, which makes it susceptible to attacks that allow threat actors to forge Kerberos tickets or reuse stolen credentials to move laterally through the network undetected and eventually escalating network privileges until they obtain full control over files, servers, and services.

This vulnerability is widely thought to have played a critical role in some of the most publicized hacks in history, including the Office of Personnel Management breach of 2015 (during which four million sensitive records were exposed), the Democratic National Committee breach of 2016 (during which almost twenty thousand emails were leaked), and the spread of BadRabbit ransomware in 2017. Historically such exploits have been virtually impossible to detect without the focused efforts of experienced incident responders conducting manual forensic analysis.

Passively capturing and storing Kerberos transactions changes Kerberos from a stateless protocol to a stateful one. This allows all transactions to be compared with previous states and deduce whether an account has been comprised and determine which type of attack was used considering both golden and silver ticket attacks bypass different steps (of the six steps) that comprise the Kerberos process.

Any detection of a client passing a TGT that was not first issued by the Kerberos Key Distribution Center (KDC) is indicative of a golden ticket attack. Any detection of a client passing a TGS that was not first issued by the Kerberos KDC is indicative of a silver ticket attack. Additional attacks may be detected when unknown Domain Controllers (DC), by which DCs that are not present in a persistent access-control list or whitelist, attempt to perform Directory Replication Service (DRS) remote procedure calls (or OpNum) of a certain number, namely 3, 5, and 17. This would indicate a DCSync (OpNum 3) attack or a DCShadow (OpNum 5 or 17) attack. These four deterministic detection methods are an improvement over the current state-of-the-art heuristic detection methods because they produce no false positives or false negatives and remove the delay time intrinsic to heuristic methodologies.

Two other attacks can be detected by means of comparing time-series data. The first is recognizing a differing IP source address than the one from which it was authenticated within a narrow time-window which may reveal a pass-the-ticket attack. The second being Kerberos tickets where the encryption has been downgraded. This was allowed by the Kerberos protocol for backwards compatibility but is antiquated and typical of a Skeleton Key attack.

Furthermore, in combination with these novel detection methods, new data pipelines within the DCG containing Sigma standards (Crowd-Sourced open repositories of detection methods and malicious files) may be used to automatically ingest operating system event logs to determine various other Kerberos attacks such as Kerberoasting, Pass-the-Hash, and Overpass-the-Hash.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane may transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

For example, the Information Assurance department is notified by the system 100 that principal X is using credentials K (Kerberos Principal Key) never used by it before to access service Y. Service Y utilizes these same credentials to access secure data on data store Z. This correctly generates an alert as suspicious lateral movement through the network and will recommend isolation of X and Y and suspension of K based on continuous baseline network traffic monitoring by the multidimensional time series data store 120 programmed to process such data 120a, rigorous analysis of the network baseline by the directed computational graph 155 with its underlying general transformer service module 160 and decomposable transformer service module 150 in conjunction with the AI and primed machine learning capabilities 130*a* of the automated planning service module 130 which had also received and assimilated publicly available from a plurality of sources through the multi-source connection APIs of the connector module 135. Ad hoc simulations of these traffic patterns are run against the baseline by the action outcome simulation module 125 and its discrete event simulator 125*a* which is used here to determine probability space for likelihood of legitimacy. The system 100, based on this data and analysis, was able to detect and recommend mitigation of a cyberattack that represented an existential threat to all business operations, presenting, at the time of the attack, information most needed for an actionable plan to human analysts at multiple levels in the mitigation and remediation effort through use of the observation and state estimation service 140 which had also been specifically preprogrammed to handle cybersecurity events 140*b*

FIG. 2 is a flow diagram of an exemplary function of the business operating system in the detection and mitigation of predetermining factors leading to and steps to mitigate ongoing cyberattacks 200. The system continuously retrieves network traffic data 201 which may be stored and preprocessed by the multidimensional time series data store 120 and its programming wrappers 120*a*. All captured data are then analyzed to predict the normal usage patterns of network nodes such as internal users, network connected systems and equipment and sanctioned users external to the enterprise boundaries for example off-site employees, contractors and vendors, just to name a few likely participants. Of course, normal other network traffic may also be known to those skilled in the field, the list given is not meant to be exclusive and other possibilities would not fall outside the design of the invention. Analysis of network traffic may include graphical analysis of parameters such as network item to network usage using specifically developed programming in the graphstack service 145, 145*a*, analysis of usage by each network item may be accomplished by specifically pre-developed algorithms associated with the directed computational graph module 155, general transformer service module 160 and decomposable service module 150, depending on the complexity of the individual usage profile 201. These usage pattern analyses, in conjunction with additional data concerning an enterprise's network topology; gateway firewall programming; internal firewall configuration; directory services protocols and configuration; and permissions profiles for both users and for access to sensitive information, just to list a few non-exclusive examples may then be analyzed further within the automated planning service module 130, where machine learning techniques which include but are not limited to information theory statistics 130*a* may be employed and the action outcome simulation module 125, specialized for predictive simulation of outcome based on current data 125*a* may be applied to formulate a current, up-to-date and continuously evolving baseline network usage profile 202. This same data would be combined with up-to-date known cyberattack methodology reports, possibly retrieved from several divergent and exogenous sources through the use of the multi-application programming interface aware connector module 135 to present preventative recommendations to the enterprise decision makers for network infrastructure changes, physical and configuration-based to cost effectively reduce the probability of a cyberattack and to significantly and most cost effectively mitigate data exposure and loss in the event of attack 203, 204.

While some of these options may have been partially available as piecemeal solutions in the past, we believe the ability to intelligently integrate the large volume of data from a plurality of sources on an ongoing basis followed by predictive simulation and analysis of outcome based upon that current data such that actionable, business practice efficient recommendations can be presented is both novel and necessary in this field.

Once a comprehensive baseline profile of network usage using all available network traffic data has been formulated, the specifically tasked business operating system continuously polls the incoming traffic data for activities anomalous to that baseline as determined by predesignated boundaries 205. Examples of anomalous activities may include a user attempting to gain access several workstations or servers in rapid succession, or a user attempting to gain access to a domain server of server with sensitive information using random userIDs or another user's userID and password, or attempts by any user to brute force crack a privileged user's password, or replay of recently issued ACTIVE DIREC-TORY™/Kerberos ticket granting tickets, or the presence on any known, ongoing exploit on the network or the introduction of known malware to the network, just to name a very small sample of the cyberattack profiles known to those skilled in the field. The invention, being predictive as well as aware of known exploits is designed to analyze any anomalous network behavior, formulate probable outcomes of the behavior, and to then issue any needed alerts regardless of whether the attack follows a published exploit specification or exhibits novel characteristics deviant to normal network practice. Once a probable cyberattack is detected, the system then is designed to get needed information to responding parties 206 tailored, where possible, to each role in mitigating the attack and damage arising from it 207. This may include the exact subset of information included in alerts and updates and the format in which the information is presented which may be through the enterprise's existing security information and event management system. Network administrators, then, might receive information such as but not limited to where on the network the attack is believed to have originated, what systems are believed currently affected, predictive information on where the attack may progress, what enterprise information is at risk and actionable recommendations on repelling the intrusion and mitigating the damage, whereas a chief information security officer may receive alert including but not limited to a timeline of the cyberattack, the services and information believed compromised, what action, if any has been taken to mitigate the attack, a prediction of how the attack may unfold and the recommendations given to control and repel the attack 207, although all parties may access any network and cyberattack information for which they have granted access at any time, unless compromise is suspected. Other specifically tailored updates may be issued by the system 206, 207.

FIG. 3 is a process diagram showing business operating system functions in use to mitigate cyberattacks. Input network data which may include network flow patterns 321, the origin and destination of each piece of measurable network traffic 322, system logs from servers and workstations on the network 323, endpoint data 323*a*, any security event log data from servers or available security information and event (SIEM) systems 324, external threat intelligence feeds 325, external network health or cybersecurity feeds 326, Kerberos domain controller or ACTIVE DIREC-TORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, and perform one time or continuous vulnerability scanning depending on client directives 367. These examples are, of course, only a subset of the possible uses of the system, they are exemplary in nature and do not reflect any boundaries in the capabilities of the invention.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140a and script interpreter 140b. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all inclusive alert, dashboard image, or report may make identification and action upon the crucial information by each participant more difficult, therefore the cybersecurity focused embodiment may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404a to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406a what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405a to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407a was stolen and predictive simulations on what the theft means to the enterprise as time progresses. Additionally, the system's predictive capabilities may be employed to assist in creation of a plan for changes of the IT infrastructural that should be made that are optimal for remediation of cybersecurity risk under possibly limited enterprise budgetary constraints in place at the company so as to maximize financial outcome.

As the embodiment is expressively scriptable in a large number of programmed capabilities, which include data presentation, the segmentation of information, parties chosen to receive information, and the information received would be expected to vary, perhaps significantly, between corporate clients of business operating system cybersecurity embodiments depending on individual corporate policies, philosophies and make-up, just to name a few examples.

Figure 5:
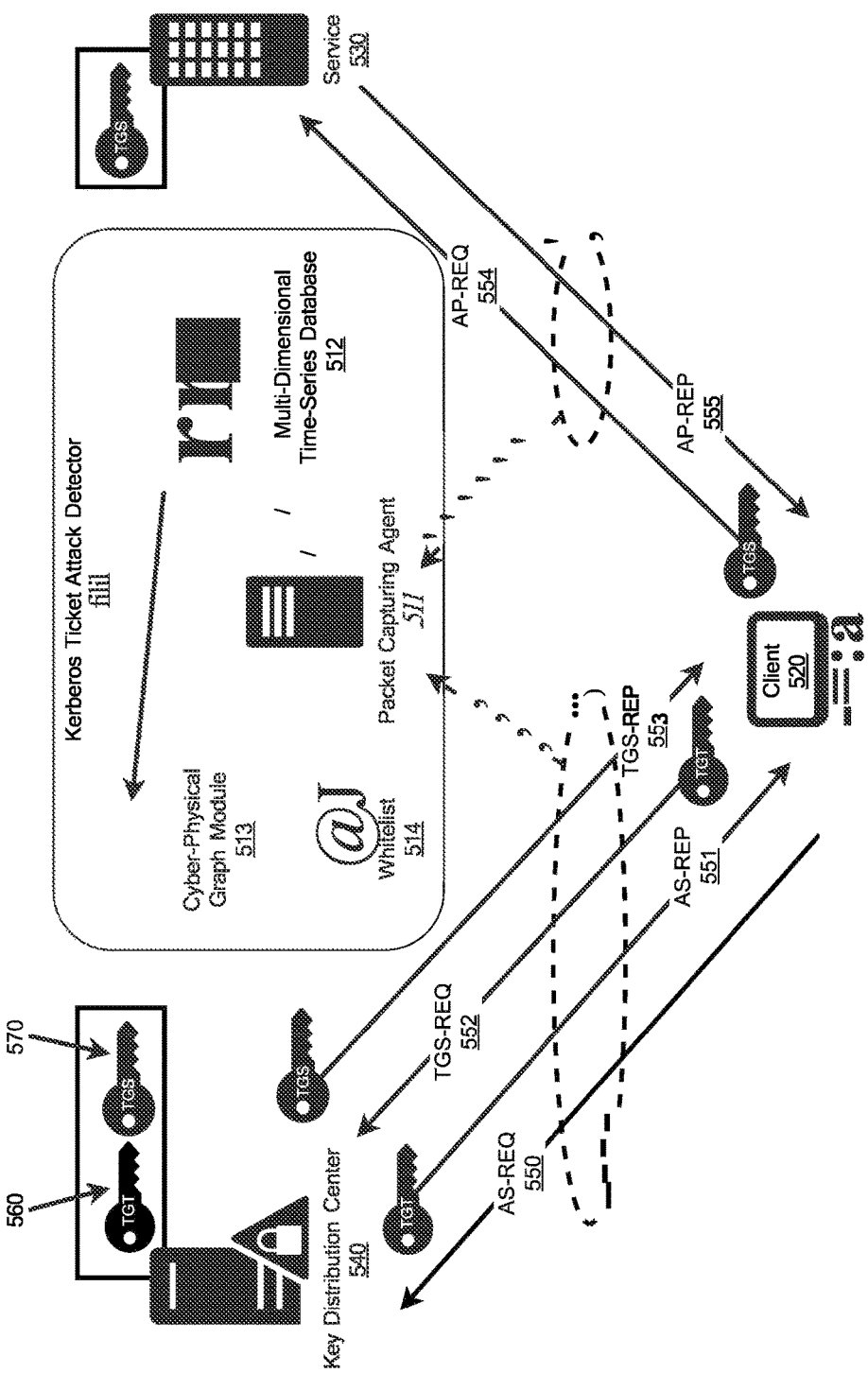
FIG. 5 is a diagram illustrating the Kerberos process with an exemplary embodiment of an event-driven Kerberos ticket attack detector.

FIG. 5 is a diagram illustrating the Kerberos process with an exemplary embodiment of an event-driven Kerberos ticket attack detector 510. In this embodiment, a Kerberos ticket attack detector 510 is implemented in an organization's network and domain. As the Kerberos protocol operates normally within the domain, the Kerberos ticket attack detector 510 passively captures, stores, and analyzes each step in the Kerberos process and alerts cyber incident response teams should an anomaly be detected.

The Kerberos process begins when a user operating on a client computer 520 (joined to the domain) attempts to access a service 530 within the domain. Many services rely on the Kerberos authentication service such as Microsoft Windows Active Directory, FTP, SSH, POP, SMTP, NFS, Samba and others. The client machine 520 sends authentication information along with a timestamp and sends this as a message to a key distribution center (KDC) 540. This message is referred to as AS-REQ 550 (authentication server—request) and is the first step in the Kerberos process.

Upon authentication, the KDC 540 issues a ticket-granting-ticket (TGT) 560 to the client encrypted with a special user on the domain controller known as krbtgt. The client cannot decrypt this ticket since the krbtgt hash is only stored on the domain controller and nowhere else. This step is known as the authentication server response or AS-REP 551.

In the third step, the client sends the TGT 560 back to the KDC 540 along with a request to access a service 530. This is called the TGS-REQ 552. The KDC 540 subsequently sends the client back a ticket-granting-service ticket 570 which allows the client 520 to access the actual service the user is interested in. This is the TGS-REP 553 step. During a golden ticket attack, the krbtgt hash is stolen and a forged TGS-REQ 552 is made effectively bypassing the client authentication step and granting the threat actor a legitimate TGS 570 ticket.

The fifth step in the Kerberos process occurs when the client 520 presents the TGS 570 ticket to the service 530 for evaluation. This step is known as AP-REQ 554. The final step, AP-REP 555, is a response from the service 530 either allowing or prohibiting access to the client 520 if the user is authorized. During a silver ticket attack, the attacker manages to extract the password or NT hash of a service account that allows them to forge a false TGS 570 ticket bypassing the KDC 540 altogether.

At each stage in the Kerberos process, a data packet is sent between the client 520 and either the KDC 540 or a service 530. In each instance, a packet capturing agent 511 (a packet capturing agent intercepts data being transmitted over a network) passively captures the data packet and stores the information contained inside in a multi-dimensional time-series database (MDTSDB) 512. The MDTSDB 512 stores the retrieved information in a ledger. Information from the data packets provide data points to a cyber-physical graph module 513 which it uses to build cyber physical graphs from which golden and silver ticket attacks may be determined. Additional information about these other attacks, MDTSDB 512 and cyber-physical graph module 513 may be found in FIG. 6 and FIG. 7.

Other Kerberos attacks may be derived from captured Kerberos traffic. In one embodiment, an authoritative list known as a whitelist 514 or access-control list is kept and contains all authorized Domain Controllers (DC) within the enterprise network. Any attempt by a device to perform a Directory Replication Service (DRS) remote procedure call (or OpNum) of a certain number, namely 3, 5, and 17, is compared against the whitelist 514. If the DRS remote procedure call originates from a device not in the white list, this would indicate a DCSync (OpNum 3) attack or a DCShadow (OpNum 5 or 17) attack.

Furthermore, recognizing a change in the source IP address of a TGT within a narrow time-window may reveal a pass-the-ticket attack. Additionally, Kerberos tickets where the encryption has been downgraded (typically from AES-128/256 to something weaker) is typical of a Skeleton Key attack.

Figure 6:
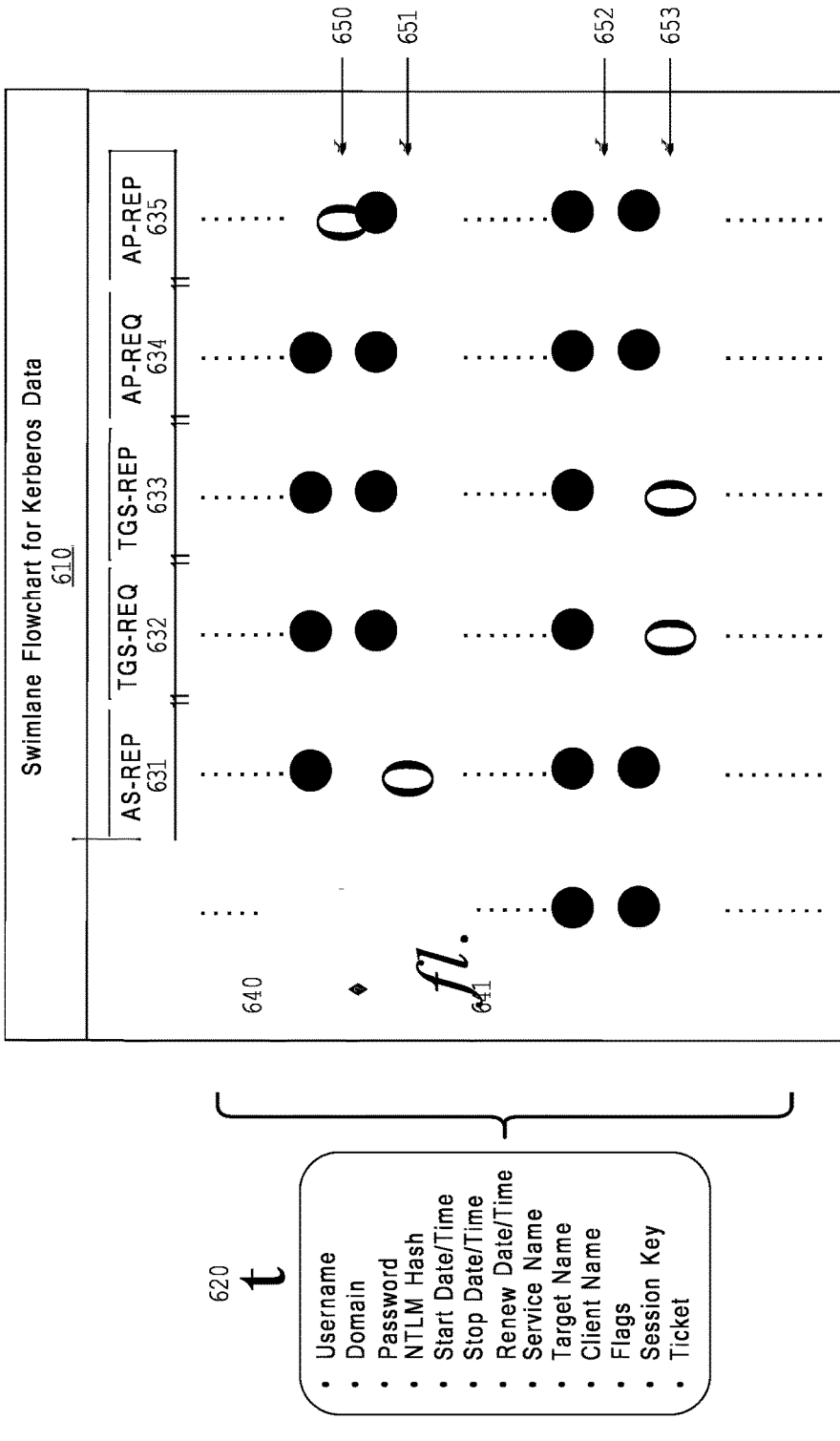
FIG. 6 is a diagram of an exemplary ledger used in transforming the stateless Kerberos protocol into a stateful protocol for use in generating cyber-physical graphs.

FIG. 6 is a diagram of an exemplary ledger used in transforming the stateless Kerberos protocol into a stateful protocol for use in generating cyber-physical graphs. In this diagram, a representation of the logical storage of Kerberos data is represented as a swimlane flowchart 610. At each step (of the six steps: AS-REQ 630, AS-REP 631, TGS-REQ 632, TGS-REP 633, AP-REQ 634, AP-REP 635) of the Kerberos process, a separate data packet is generated. Each separate data packet correlates with one of the six Kerberos steps. During the transmission of each data packet, the data packet is intercepted, and the information 620 contained within is extracted and stored in a MDTSDB.

The following are examples of information that can be extracted from a typical Kerberos request or response TCP/UDP packet: version number of ticket format, service realm, service principal, ticket flags (various types), the session key, client realm, client principal (username) list of Kerberos realms that took part in authenticating the user to whom this ticket was issued, timestamp and other meta data about last initial request, time the client was authenticated, validity period start time, validity period end time, Ticket Granting Server Name/ID, timestamp, client (workstation) Address, lifetime, and authorization-data—used to pass authorization data from the principal on whose behalf a ticket was issued to the application service.

Each data packet associated with a step is logged in the relevant step swimlane. As an example, if a client is currently receiving a TGS ticket from the KDC, the intercepted data packet would be stored in the TGS-REP 633 swimlane in the proper row associated with that overall Kerberos transaction. Additionally, solid circles 640 represent intercepted data packets (and contained information) whereas non-filled circles 641 represent data packets that were never generated. Each row 650, 651, 652, and 653 represents a complete six step Kerberos transaction. The first row shown 650 illustrates an example where the approval response (AP-REP 635) step has yet to take place or will not take place. The subsequent row 651 is a completed Kerberos transaction but one where the AS-REQ 630 and AS-REP 631 never transpired. This is indicative of a golden ticket attack. The third row 652 is an example of a successful and legitimate Kerberos transaction whereas, the fourth row 653 reveals a silver ticket attack. A cyber-physical graph module retrieves each data point 640, 641 and its associated information 620 for generating a cyber-physical graph which allows the detection of these attack patterns in real-time.

Figure 7:
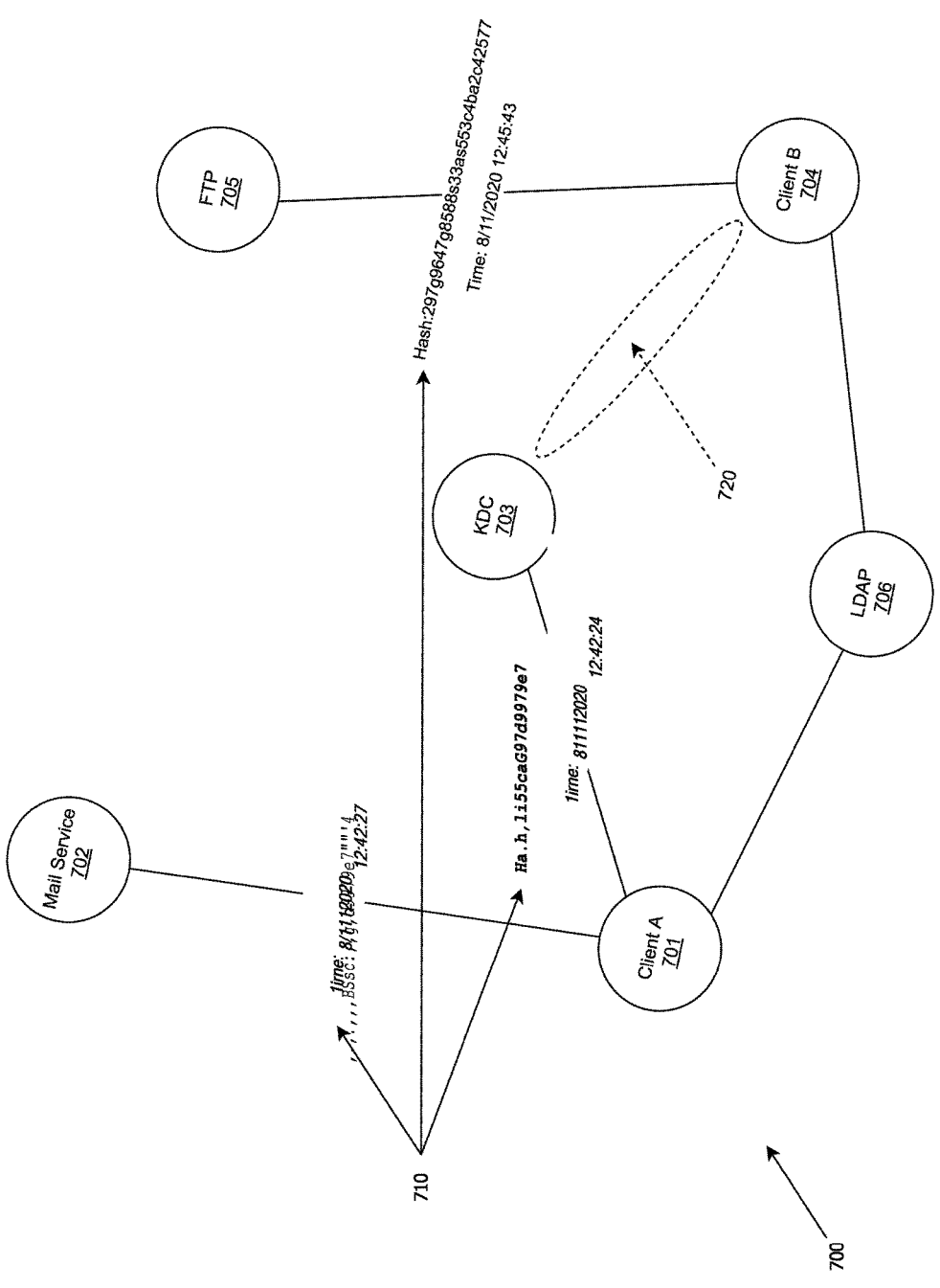
FIG. 7 is a diagram of an exemplary cyber physical graph used in detecting golden and silver ticket attacks.

FIG. 7 is a diagram of an exemplary cyber physical graph used in detecting golden and silver ticket attacks. In this simplified example, a cyber physical graph 700 represents two Kerberos transactions. The first transaction illustrates a genuine Kerberos operation between client A 701 and the domain's mail exchange server 702. Information from the intercepted data packets stored within the MDTSDB are connected by hash and time values 710 and make up this embodiment of the cyber-physical graph 700. Comparing the hash and time values 710 confirms legitimate TGT and TGS tickets were exchanged between the client A 701, the KDC 703, and the mail service 702.

The second transaction in the cyber-physical graph 700 occurs between client B 704 and a member server running the file transfer protocol (FTP) 705. This transaction illustrates a typical silver ticket attack because there is no corresponding authorization request 720 from client B 704 to the KDC 703. These attack patterns, such as the previously described silver ticket attack, can be detected by graph analysis, and set up to send automated alerts to incident response teams or to implement new configuration parameters on network equipment to impede the attack. Responses to these attacks vary from organization to organization, however each organization's security posture is now superior due to the near real-time detection of these most egregious attacks.

This example is simplified for illustration purposes and any plurality of information extracted from Kerberos packets or other data sources should be considered a viable node or edge of the cyber-physical graph. Examples comprise extracted LDAP 706 information, SNMP information, and port scans along with IP address and encryption information for use in detecting other Kerberos Attacks.

Figure 8:
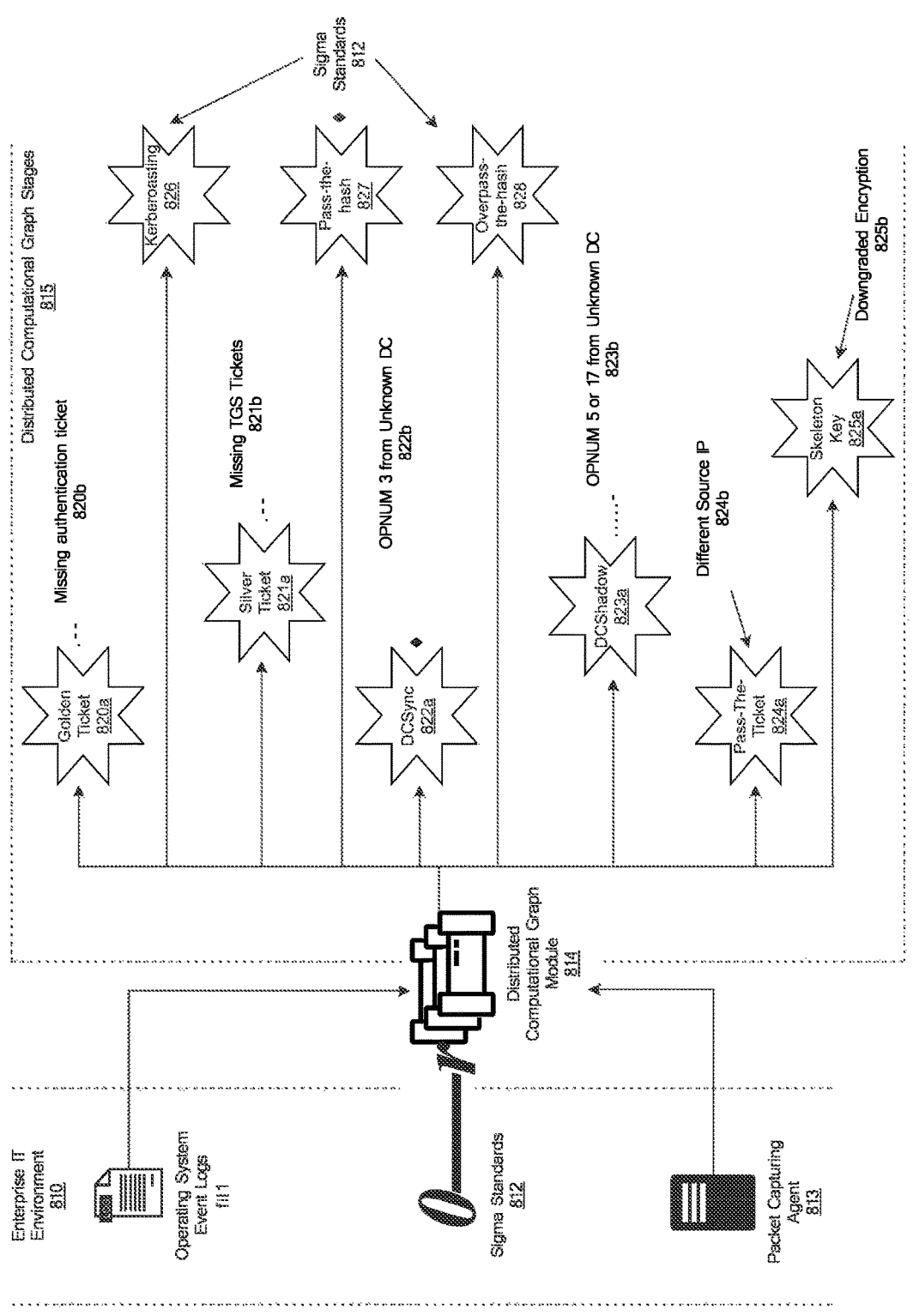
FIG. 8 is a diagram of an exemplary embodiment of detecting Kerberos attacks via stream-processing.

FIG. 8 is a diagram of an exemplary embodiment of detecting Kerberos attacks via stream-processing. In this embodiment, Kerberos detections happen in real-time via stream-processing in a distributed computational graph 814, which is declarative programming logic in an orchestrated (multi-automated) data workflow. This architecture is also contained in U.S. patent application Ser. No. 16/412,340, which is incorporated herein by reference.

One advantage of this embodiment is the real-time detection of Kerberos attacks. As data travels around an enterprise IT environment 810, a packet capturing agent 813 passively captures Kerberos traffic where the information contained therein is processed by declarative computational stages 815. The same logic used for the detection of Golden ticket 820*a* (missing authentication ticket 820*b*), Silver ticket 821*a* (missing TGS ticket 821*b*), DCSync 822*a* (OpNum 3 from unlisted DC 822*b*), DCShadow 823*a* (OpNum 5 or 17 from unlisted DC 823*b*), Pass-the-ticket 824*a* (different IP within a window 824*b*), and Skeleton Key 825*a* (downgraded encryption 825*b*) attacks previously described in FIG. 5 is also used here.

Furthermore, in combination with these novel detection methods 820*b*-825*b*, additional data pipelines within the DCG 814 containing Sigma standards (Crowd-Sourced open repositories of detection methods and malicious files) 812 may be used to automatically ingest operating system event logs 811 to determine various other Kerberos attacks such as Kerberoasting 826, Pass-the-Hash 827, and Overpass-the-Hash 828. According to one embodiment, translating the Sigma rules into a fixpoint Boolean logic allows for a set of declarative domain-agnostic and source-agnostic specifications in order to create furthers detection logic DCG stages. This embodiment provides both speed, accuracy, and precision over current state-of-the-art Kerberos detection methods and may also be combined with event-driven embodiments (referring to FIG. 5) to provide the desired level of detection.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 9:
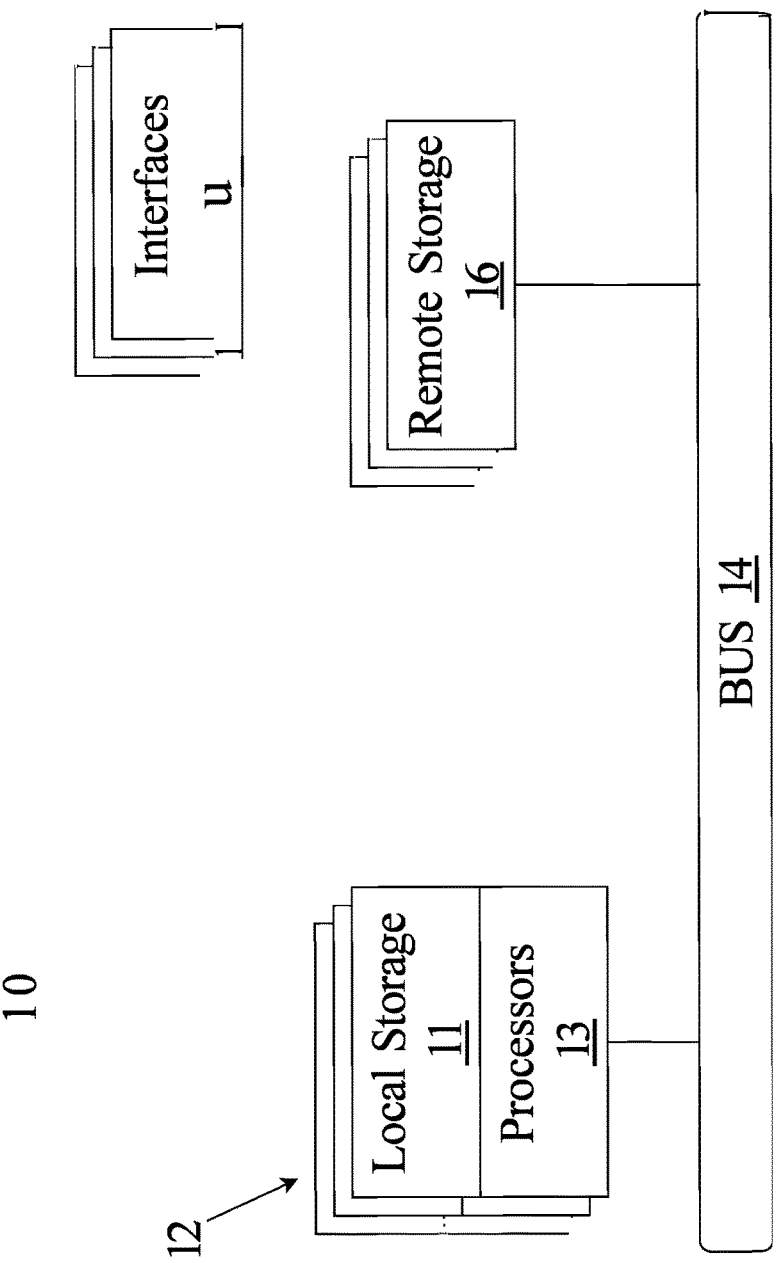
FIG. 9 is a block diagram illustrating an exemplary hardware architecture of a computing device used in various embodiments of the invention.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
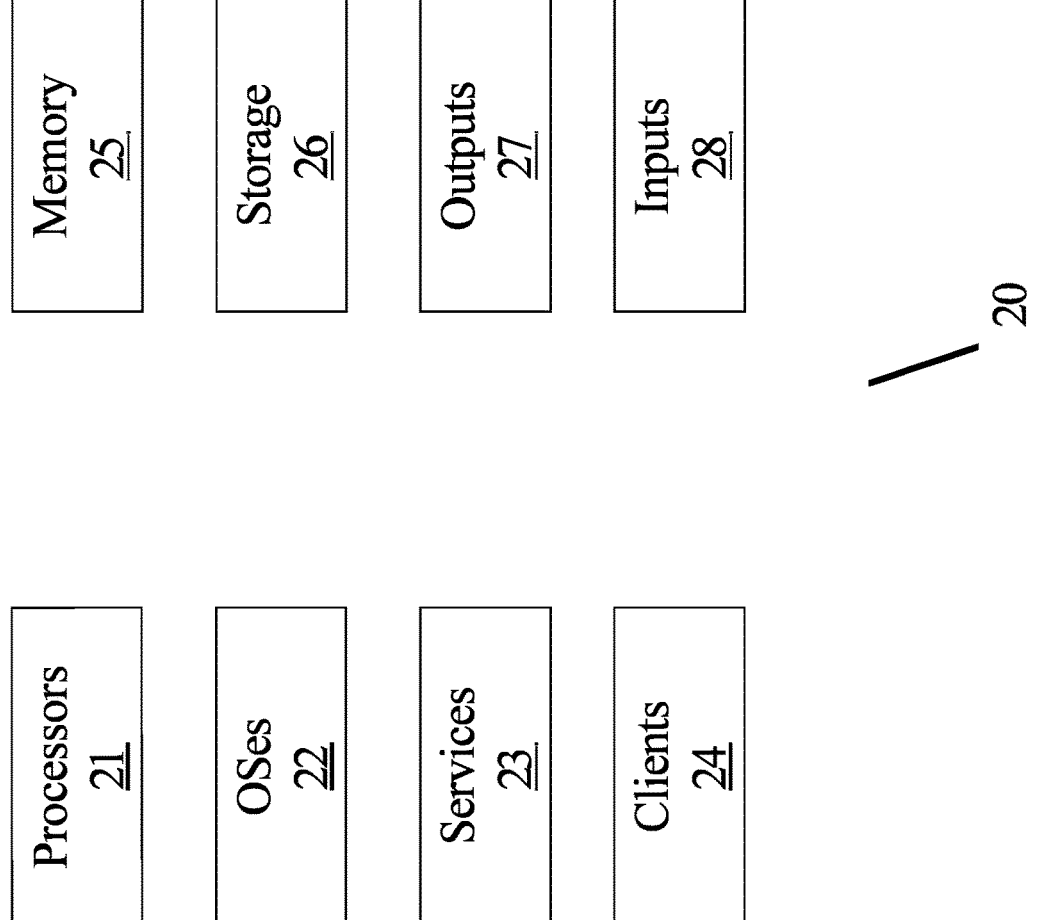
FIG. 10 is a block diagram illustrating an exemplary logical architecture for a client device, according to various embodiments of the invention.

In some aspects, systems may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
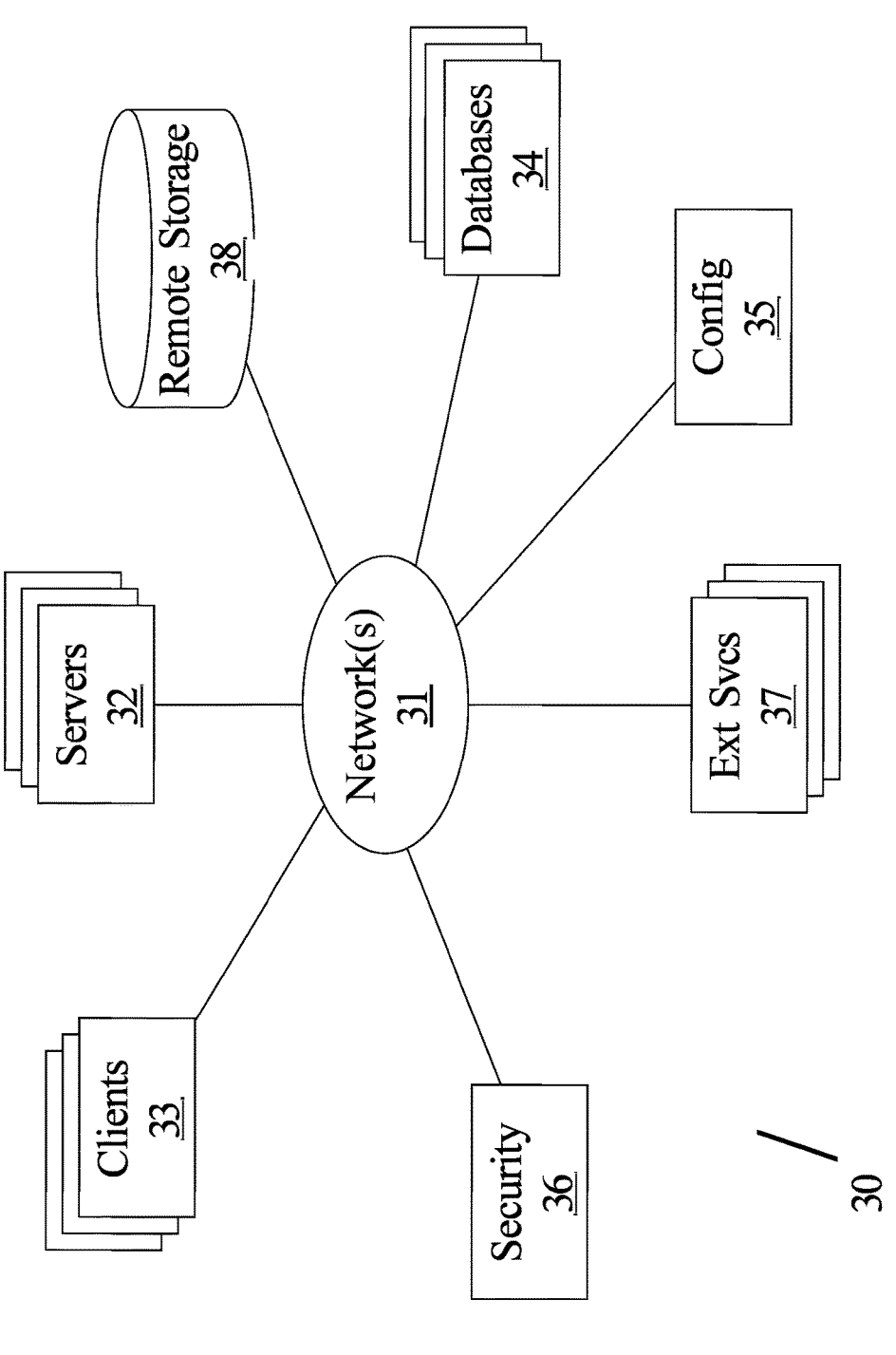
FIG. 11 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 12:
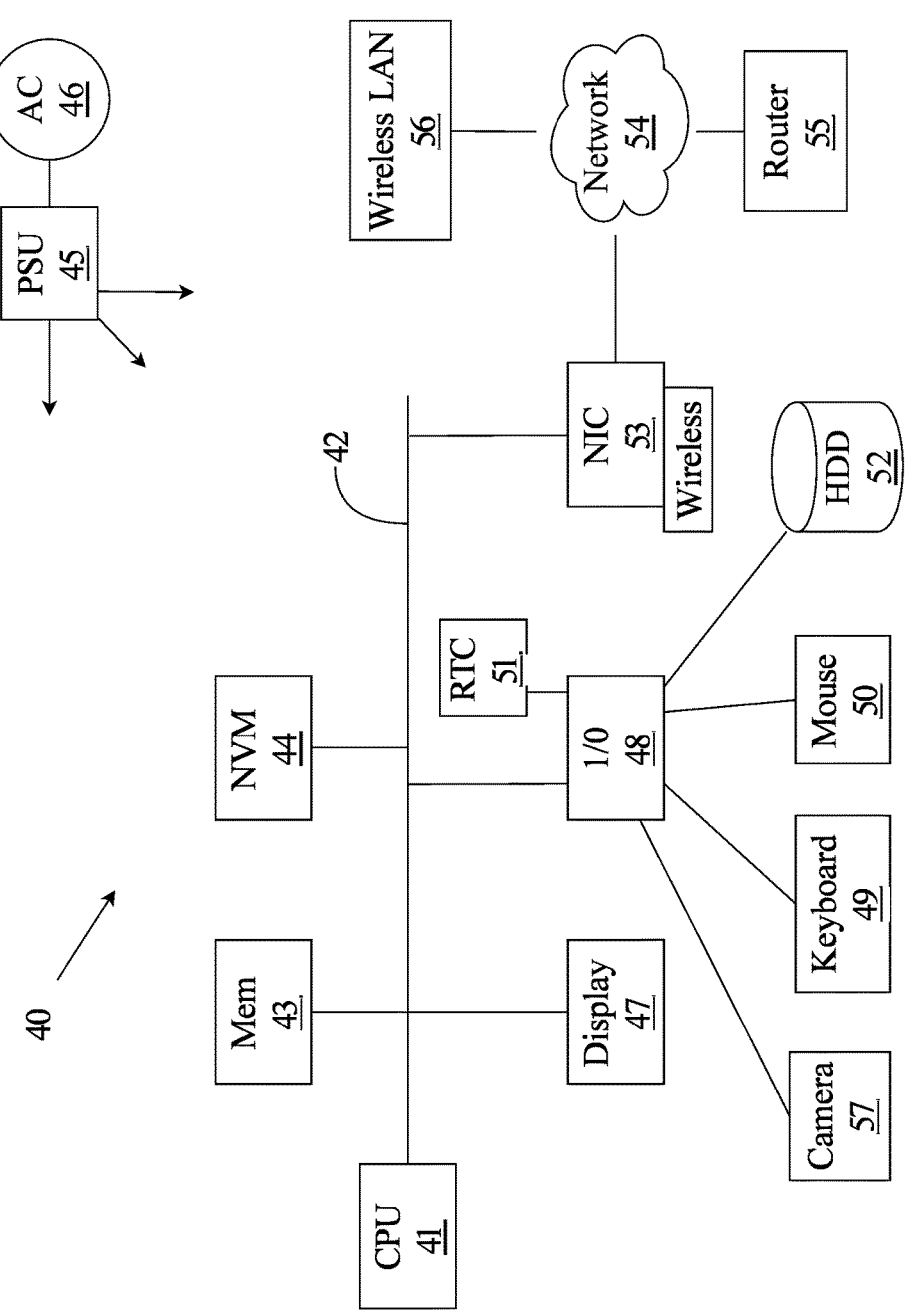
FIG. 12 is another block diagram illustrating an exemplary hardware architecture of a computing device used in various embodiments of the invention.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for detection of network cybersecurity events using stateful authentication, comprising:

a memory storing instructions to be executed by one or more hardware processors; and one or more hardware processors configured to execute the instructions stored in the memory, wherein the instructions, when executed by the one or more hardware processors, cause the system to:

retrieve a plurality of cyber-physical information associated with a network, wherein the cyber-physical information comprises authentication event data associated with an authentication protocol transaction for one or more clients, services, individuals, users, physical devices, or key distribution centers;

create a knowledge graph representing the network based on the retrieved cyber-physical information, wherein the knowledge graph comprises:

nodes representing the clients, services, individuals, users, physical devices or key distribution centers associated with the network; and edges connecting two or more nodes, wherein the edges represent the authentication event data associated with the authentication protocol transaction between the two or more nodes connected by the respective edge;

maintain a ledger of exchanges that occur as part of the authentication protocol transactions, wherein entries in the ledger link steps of the authentication protocol transactions such that state of the authentication protocol transactions is detectable; and identify cybersecurity attacks by detecting the state of the authentication protocol transactions based on the plurality of cyber-physical information in the knowledge graph.

2. The system of claim 1, wherein the instructions, when executed by the one or more hardware processors, further cause the system to:

build a subgraph for each individual or user within the knowledge graph;

determine a pattern of authentications for each individual or user based on the respective subgraph; and identify credential theft by comparing a current individual or user authentication transaction against the pattern of authentications for the current individual or user to detect anomalous authentication behavior.

3. The system of claim 1, wherein the cyber-physical information further comprises reachability properties for each node in the knowledge graph.

4. The system of claim 3, wherein the reachability properties for each node are represented as an edge connecting a first node to one or more other nodes based on the reachability properties.

5. The system of claim 1, wherein the instructions, when executed by the one or more hardware processors, further cause the system to:

create a graph of networks, wherein the graph of networks comprises network nodes representing entire networks and edges representing events that occur between and among network nodes; and wherein the knowledge graph is represented as a node in the graph of networks.

6. The system of claim 1, wherein a distributed computational graph is employed for event-driven and stream-processing detection of the state of the authentication protocol transaction.

7. The system of claim 1, wherein the edges further comprise time and date information associated with the authentication protocol transaction between the two or more nodes connected by the respective edge.

8. The system of claim 1, wherein the edges further comprise Internet Protocol (IP) information associated with the authentication protocol transaction between the two or more nodes connected by the respective edge.

9. The system of claim 1, wherein the edges further comprise hash and encryption information associated with the authentication protocol transaction between the two or more nodes connected by the respective edge.

10. A method for detection of network cybersecurity events using stateful authentication, comprising the steps of:

retrieving a plurality of cyber-physical information associated with a network, wherein the cyber-physical information comprises authentication event data associated with an authentication protocol transaction for one or more clients, services, individuals, users, physical devices, or key distribution centers;

creating a knowledge graph representing the network based on the retrieved cyber-physical information, wherein the knowledge graph comprises:

nodes representing the clients, services, individuals, users, physical devices or key distribution centers associated with the network; and edges connecting two or more nodes, wherein the edges represent the authentication event data associated with the authentication protocol transaction between the two or more nodes connected by the respective edge;

maintaining a ledger of exchanges that occur as part of the authentication protocol transactions, wherein entries in the ledger link steps of the authentication protocol transactions such that state of the authentication protocol transactions is detectable; and identifying cybersecurity attacks by detecting the state of the authentication protocol transactions based on the plurality of cyber-physical information in the knowledge graph.

11. The method of claim 10, further comprising the steps of:

building a subgraph for each individual or user within the knowledge graph;

determining a pattern of authentications for each individual or user based on the respective subgraph; and identifying credential theft by comparing a current individual or user authentication transaction against the pattern of authentications for the current individual or user to detect anomalous authentication behavior.

12. The method of claim 10, wherein the cyber-physical information further comprises reachability properties for each node in the knowledge graph.

13. The method of claim 12, wherein the reachability properties for each node are represented as an edge connecting a first node to one or more other nodes based on the reachability properties.

14. The method of claim 10, further comprising the steps of:

creating a graph of networks, wherein the graph of networks comprises network nodes representing entire networks and edges representing events that occur between and among network nodes; and wherein the knowledge graph is represented as a node in the graph of networks.

15. The method of claim 10, wherein a distributed computational graph is employed for event-driven and stream-processing detection of the state of the authentication protocol transaction.

16. The method of claim 10, wherein the edges further comprise time and date information associated with the authentication protocol transaction between the two or more nodes connected by the respective edge.

17. The method of claim 10, wherein the edges further comprise Internet Protocol (IP) information associated with the authentication protocol transaction between the two or more nodes connected by the respective edge.

18. The method of claim 10, wherein the edges further comprise hash and encryption information associated with the authentication protocol transaction between the two or more nodes connected by the respective edge.

\*    \*    \*    \*    \*